United States Patent [19]
Laing

[11] Patent Number: 5,966,916
[45] Date of Patent: Oct. 19, 1999

[54] WINDROW TURNING APPARATUS

[76] Inventor: Murray Robert Laing, 27031 Twp Rd. 510, Spruce Grove, Alberta, Canada, T7Y 1H6

[21] Appl. No.: 08/999,147

[22] Filed: Dec. 29, 1997

[51] Int. Cl.[6] .................................................. A01D 78/00
[52] U.S. Cl. .............................................. 56/377; 56/341
[58] Field of Search ........................... 56/341, 377, 365, 56/366, 367, 370, 384, DIG. 21, 380, 379, 385, 396; 171/63, 65; 172/456, 311, 457

[56] References Cited

U.S. PATENT DOCUMENTS

| | | | |
|---|---|---|---|
| 2,892,300 | 6/1959 | Van der Lely | 56/377 |
| 4,077,189 | 3/1978 | Hering . | |
| 4,183,198 | 1/1980 | Sligter | 56/377 |
| 4,214,428 | 7/1980 | Caraway . | |
| 4,753,063 | 6/1988 | Buck | 56/377 |
| 5,065,570 | 11/1991 | Kuehn | 56/377 |
| 5,685,135 | 11/1997 | Menichetti | 56/377 X |

FOREIGN PATENT DOCUMENTS 23 59 224   11/1973   Germany .

*Primary Examiner*—Thomas B. Will
*Assistant Examiner*—Robert Pezzuto
*Attorney, Agent, or Firm*—Davis and Bujold

[57] ABSTRACT

A windrow turning apparatus which mounts to a front of a tractor and has a first rake support assembly and a second rake support assembly. The rake support assemblies support rotary raking wheels at an angle in relation to a support frame extending from a forward end outwardly toward a tractor attachment end. A farmer can lower either the first rake support assembly or the second rake support assembly to an operative position, depending upon the direction that windrow needs to be turned in order to maintain consistent windrow spacing.

4 Claims, 6 Drawing Sheets

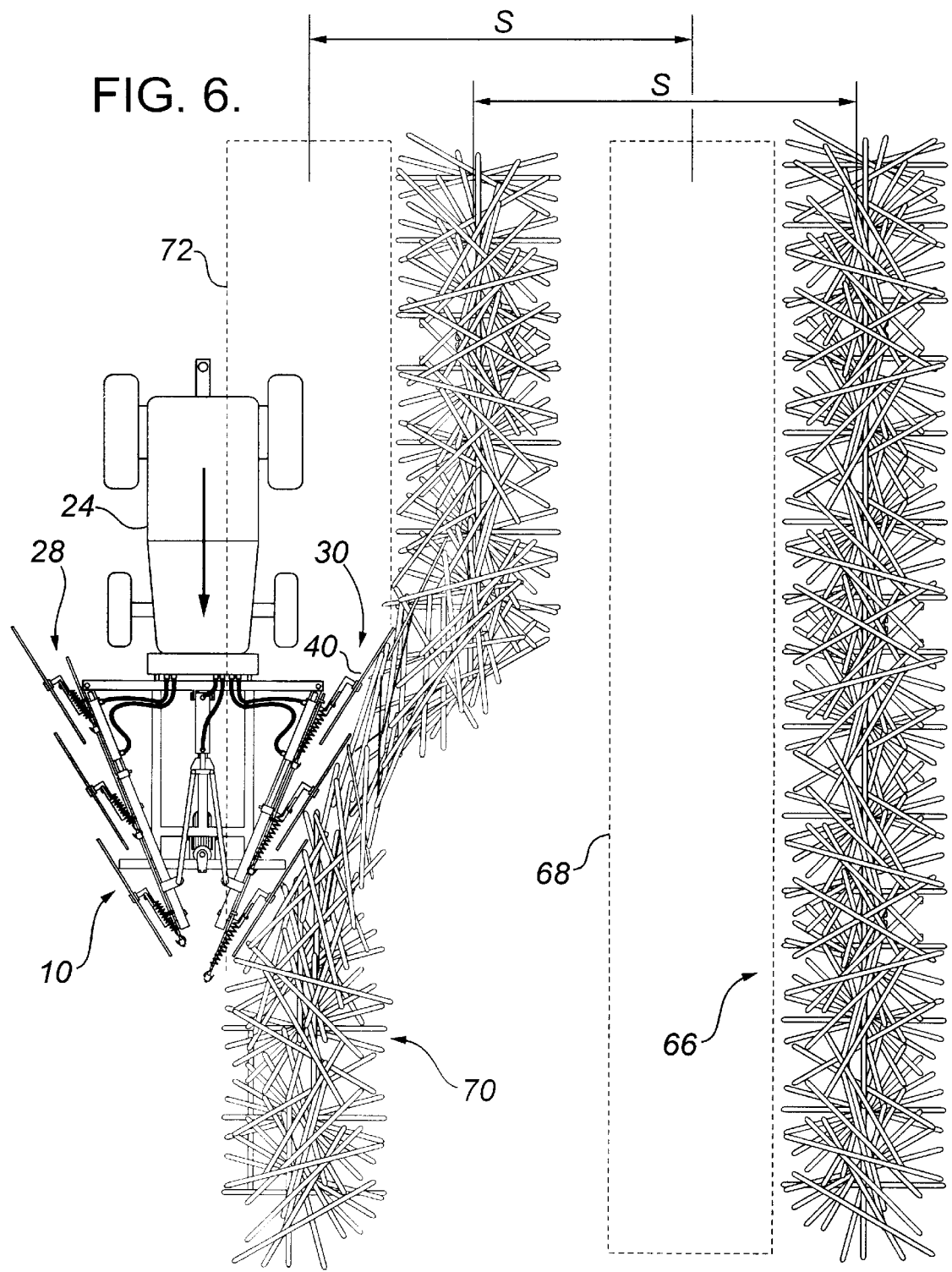

WINDROW TURNING APPARATUS

FIELD OF THE INVENTION

The present invention relates to a windrow turning apparatus and, in particular, a windrow turning apparatus adapted for mounting to the front of a tractor.

BACKGROUND OF THE INVENTION

Windrow turning apparatus are a specialized type of raking apparatus that are used to turn windrows that have become laden with moisture due to exposure to rain or snow. A top layer of a windrow that has been exposed to rain or snow, rapidly dries as a result of the action of the sun and wind. A bottom layer of a windrow remains moist and will experience deterioration, unless the windrow is turned so that the bottom layer can be dried by exposure to sun and wind. It is generally considered advantageous to avoid altering the spacing between the windrows that are turned. When the spacing between the windrows is altered it adversely effects the ability to subsequently process the windrows using other machinery.

A review of the prior art discloses a number of raking apparatus that are adapted to be mounted to the front of a tractor; German Patent 2,359,224; U.S. Pat. No. 4,077,189; and U.S. Pat. No. 4,214,428. These raking apparatus are not used to turn windrows, but are intended to move two windrows toward each other in order to feed a baling apparatus. Although the patents listed differ in their raking mechanisms, they all have two rakes mounted to a front of a tractor; the rakes being oriented to funnel two windrows inwardly toward a baling apparatus being towed behind the tractor.

SUMMARY OF THE INVENTION

What is required is windrow turning apparatus adapted to be mounted to the front of a tractor.

According to the present invention there is provided a windrow turning apparatus which includes a support frame having a first side, a second side, a forward end and a tractor attachment end. Means is provided for mounting the tractor attachment end of the support frame to a front of a tractor. A first rake support assembly is secured to the first side of the support frame. First raking means are supported by the first rake support assembly in an operative position at an angle in relation to the support frame extending from the forward end outwardly toward the tractor attachment end. A second rake support assembly is secured to the second side of the support frame. Second raking means supported by the second rake support assembly in an operative position at an angle in relation to the support frame extending from the forward end outwardly toward the tractor attachment end. Means are provided for raising and lowering one of the first rake support assembly and the second rake support assembly, thereby bringing one of the first raking means and the second raking means into the operative position.

The windrow turning apparatus, as described above, has a different angular orientation than front mounted raking apparatus which were developed for use with baling apparatus. The front mounted raking apparatus developed for use with baling apparatus, have rake supports that are angled inwardly from the forward end to the tractor attachment end. The windrow turning apparatus described above, has rake supports that are angle outwardly from the forward end to the tractor attachment end. Unlike the front mounted raking apparatus, developed for use with baling apparatus, the first and second rake supports of the windrow turning apparatus described above are not intended to both be lowered to an operative position at the same time. The intention is that either one or the other will be in an operative position during use, but not both.

With rear mounted windrow turning apparatus, the farmer is constantly having to look rearwardly. This results in farmers being fatigued by sore necks. With the front mounted windrow turning apparatus described above, the farmer can monitor the windrow turning operation by looking forwardly.

With most windrow turning apparatus, it is difficult (in some cases impossible) to maintain row spacing between the windrows during the windrow turning operation. On the first pass down the field the first windrow is moved to the right in relation to the direction of travel of the tractor. When the tractor reaches the end of the field, it turns, and on the second pass down the field the second windrow is also moved to the right in relation to direction of travel of the tractor. However, since the tractor has turned 180 degrees, this results in the second windrow being moved closer toward the first windrow. When the tractor reaches the end of the field, it turns, and on the third pass down the field the third windrow is also moved to the right in relation to the direction of travel of the tractor. However, since the tractor has turned 180 degrees, this results in the third windrow being moved away from the second windrow. This problem is addressed with the windrow turning apparatus as described above. The farmer lowers the first rake support. On the first pass down the field the first windrow is moved by the first raking means to the right in relation to the direction of travel of the tractor. When the tractor reaches the end of the field, it turns, and the farmer raises the first rake support and lowers the second rake support. On the second pass down the field the second windrow is moved by the second raking means to the left in relation to the direction of travel of the tractor, thereby maintaining windrow spacing. When the tractor reaches the end of the field, it turns, and the farmer raises the second rake support and lowers the first rake support. On the third pass down the field the third windrow is moved by the first raking means to the right in relation to the direction of travel of the tractor, thereby maintaining windrow spacing. It can be seen that merely by utilizing the first rake support and then the second rake support, the farmer can maintain windrow spacing during the windrow turning operation.

Although beneficial results may be obtained through the use of the windrow turning apparatus, as described above, the ground surface of most fields has a plurality of contours. Even more beneficial results may, therefore, be obtained when each of the first rake support assembly and the second rake support assembly have remote ends supported in the operative position by ground engaging wheels. This enables the first rake support assembly and the second rake support assembly to independently follow the ground surface contours.

Although beneficial results may be obtained through the use of the windrow turning apparatus, as described above, there is an advantage to being able to raise and lower the first rake support assembly and the second rake support assembly while in motion. Even more beneficial results may, therefore, be obtained when hydraulic cylinders are used as means for raising and lowering one of the first rake support assembly and the second rake support assembly.

Although beneficial results may be obtained through the use of the windrow turning apparatus, as described above, it is advantageous to be able to alter the raking angle. Even more beneficial results may, therefore, be obtained when hydraulic cylinders are provided for altering the extent to which the first rake support assembly and the second rake support assembly are angled outwardly from the forward end to the tractor attachment end.

Although there are various ways of mechanically configuring the rake support assemblies, it is preferred that each rake support assembly include a primary support arm and a plurality of secondary support arms. Each of the secondary support arms have a first end and a second end. The first end is pivotally mounted to the primary support arm for pivotal movement about a substantially horizontal axis. Means is provided for linking the secondary support arms such that movement of one of the secondary support arms results in movement of all of the secondary support arms.

BRIEF DESCRIPTION OF THE DRAWINGS

These and other features of the invention will become more apparent from the following description in which reference is made to the appended drawings, wherein:

FIG. 6 is a second top plan view of the windrow turning apparatus illustrated in FIG. 1, in operation on a tractor in a field.

DETAILED DESCRIPTION OF THE PREFERRED EMBODIMENT

Figure 1:
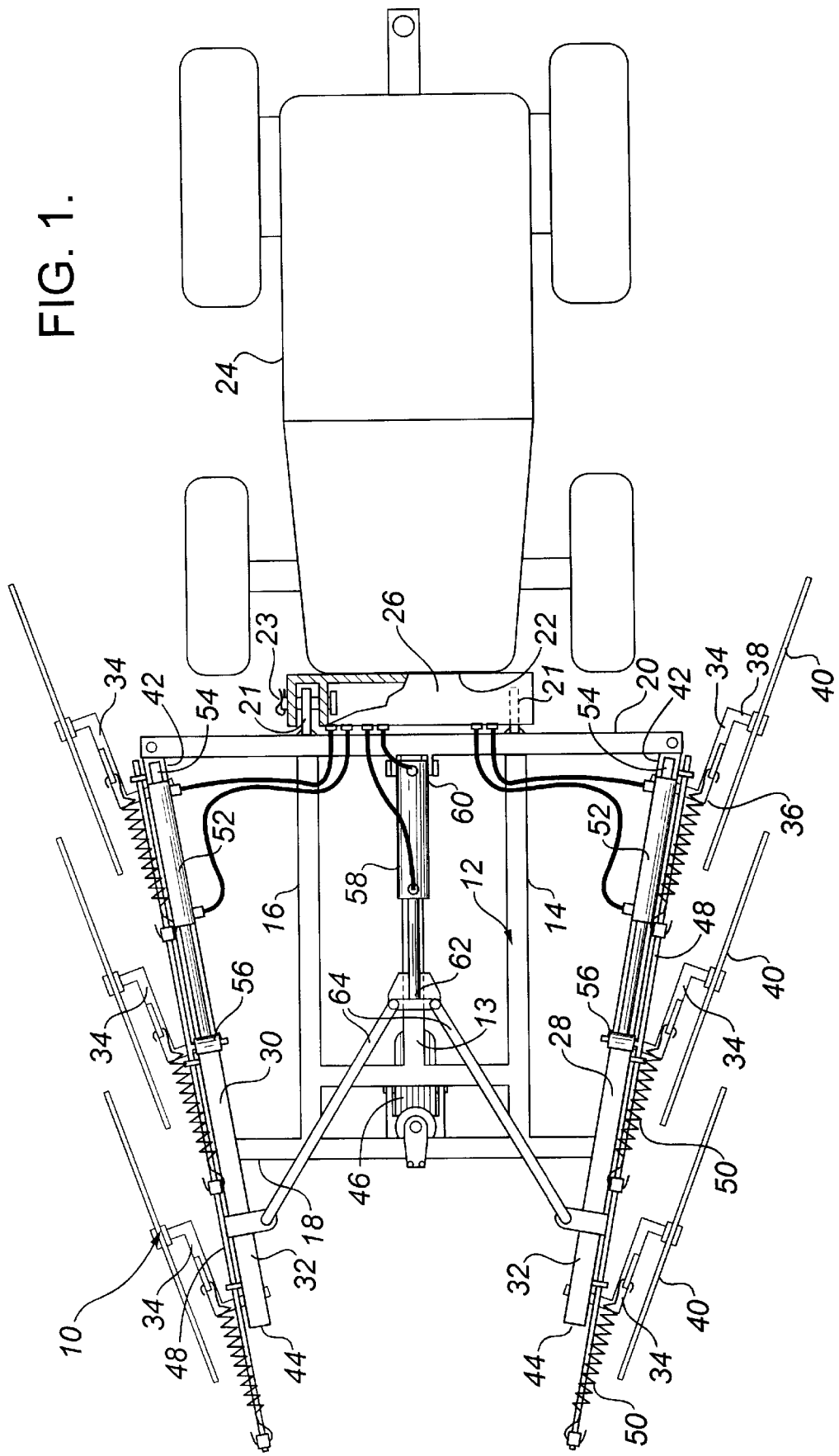
FIG. 1 is a first top plan view of a windrow turning apparatus constructed in accordance with the teaching of the present invention, with the first rake support assembly and the second rake support assembly being in a first angular position.

The preferred embodiment, a windrow turning apparatus generally identified by reference numeral 10, will now be described with reference to FIGS. 1 through 6.

Figure 2:
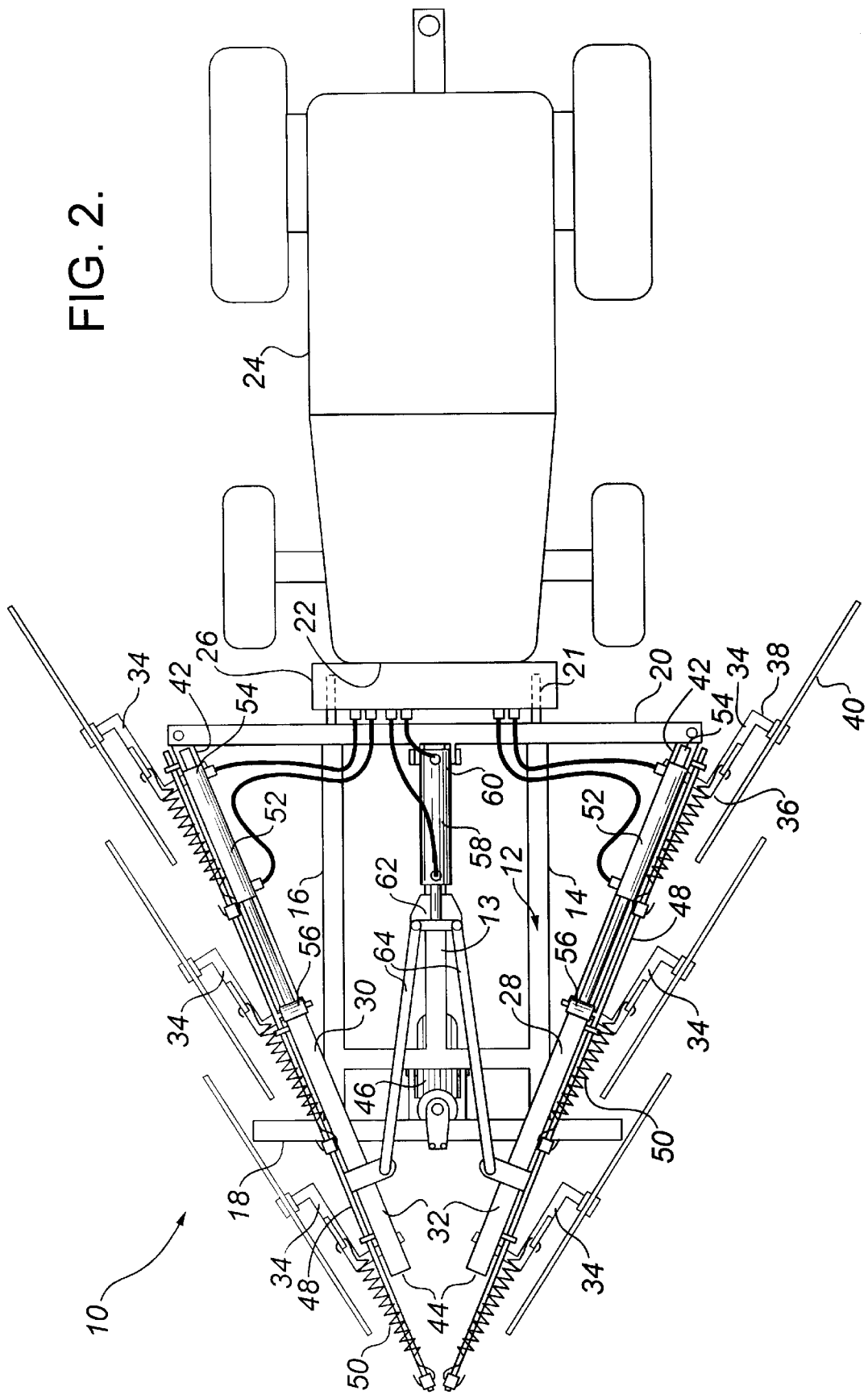
FIG. 2 is a second top plan view of a windrow turning apparatus constructed in accordance with the teaching of the present invention, with the first rake support assembly and the second rake support assembly being in a second angular position.
Figure 3:
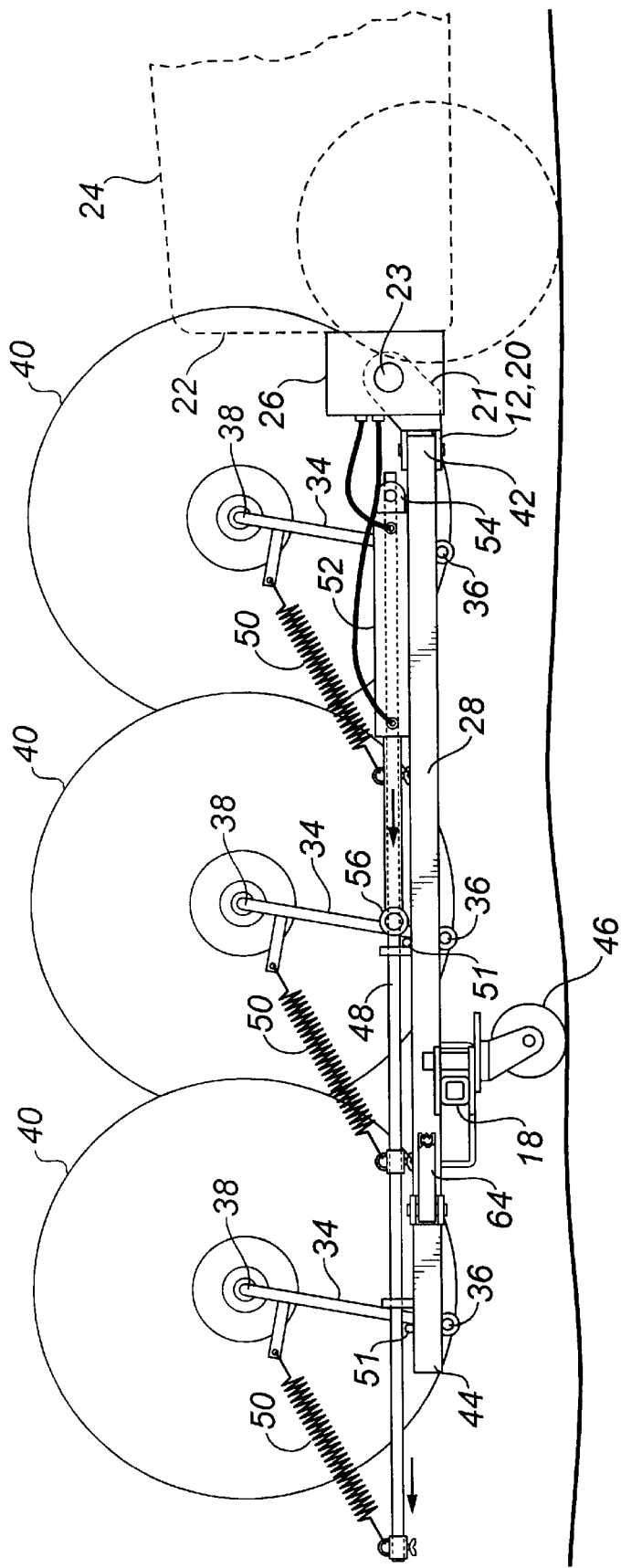
FIG. 3 is a first detailed side elevation view of one of the rake support assemblies illustrated in FIG. 1, with rotary raking wheels in a raised travel position.
Figure 4:
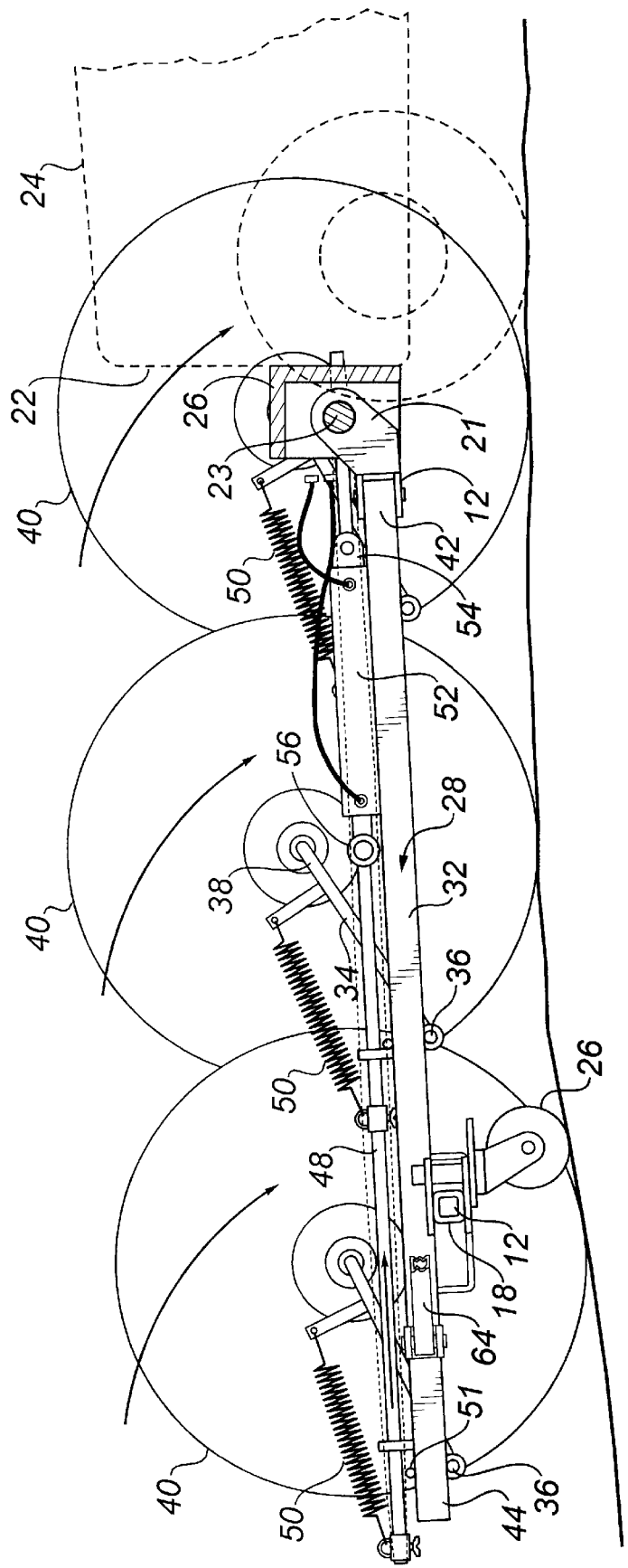
FIG. 4 is a second detailed side elevation view of one of the rake support assemblies illustrated in FIG. 1, with rotary raking wheels in a lowered operative ground engaging position.

Referring to FIGS. 1 and 2, windrow turning apparatus includes a support frame 12 having a first side 14, a second side 16, a forward end 18 and a tractor attachment end 20. Means is provided for mounting tractor attachment end 20 of support frame 12 to a front 22 of a tractor 24. The means can vary, illustrated is a mounting bar 26 which includes horizontally oriented pivot pins 23 which engage apertures in support frame 12. A first rake support assembly 28 is secured to first side 14 of support frame 12. A second rake support assembly 30 is secured to second side 16 of support frame 12. Referring to FIGS. 3 and 4, each of the rake support assemblies includes a primary support arm 32 and a plurality of secondary support arms 34. Each of secondary support arms 34 has a first end 36 and a second end 38. First end 36 is pivotally mounted to primary support arm 32 for pivotal movement about a substantially horizontal axis. Second end 38 supports one of a plurality of rotary raking wheels 40 for rotation about a substantially horizontal axis. Each of the rake support assemblies has an attachment end 42 and a remote end 44. Attachment end 42 is pivotally attached to support frame 12 for pivotally movement about a substantially vertical axis. Remote end 44 is supported by ground engaging wheels 46. Support frame 12 pivots about pivot pins 23 as ground engaging wheels 46 follow ground surface contours. Control bars 48 are associated with each of primary support arms 32. Each of secondary support arms 34 is linked by a spring 50 to control bar 48. Referring to FIG. 3, upon movement of control bar 48 in a first direction, secondary support arms 34 are drawn by springs 50 to a raised travel position in which support arms 34 engage rotational stops 51. Referring to FIG. 4, upon movement of control bar 48 in a second direction secondary support arms 34 are lowered by force of gravity to an operative ground engaging position. Referring to FIGS. 1 and 2, hydraulic cylinders 52 are provided having a first end 54 secured to primary support arm 32 and a second end 56 secured to control bar 48. Hydraulic cylinders 52 provide the motive force to move control bars 48 in the first direction and the second direction thereby raising secondary support arms 34 to the travel position or lowering the secondary support arms 34 to the operative ground engaging position. When in the operative position, rotary raking wheels 46 are supported by the rake support assemblies at an angle in relation to support frame 12 which extends from forward end 18 outwardly toward tractor attachment end 20. An hydraulic cylinder 58 is provided having a first end 60 and a second end 62. First end 60 is secured to support frame 12. Second end 62 is secured to linkage rods 64 which are attached to remote end 44 of each of the rake support assemblies. Hydraulic cylinder 58 provides the motive force to move linkage rods 64 in a first direction and a second direction. Second end 62 of hydraulic cylinder 58 is in the form of a yoke that engages a supporting guide rod 13 that is a portion of support frame 12. Guide rod 13 provides underlying support for the movement of second end 62 of hydraulic cylinder 58. Referring to FIG. 1, upon movement of linkage rods 64 in the first direction remote ends 44 of first rake support assembly 28 and second rake support assembly 30 are pushed apart. Referring to FIG. 2, upon movement of linkage rods 64 in the second direction remote ends 44 of first rake support assembly 28 and second rake support assembly 30 are drawn together. In this fashion hydraulic cylinder 58 is used to alter the extent to which first rake support assembly 28 and second rake support assembly 30 are angled outwardly from forward end 18 to tractor attachment end 20 of support frame 12.

Figure 5:
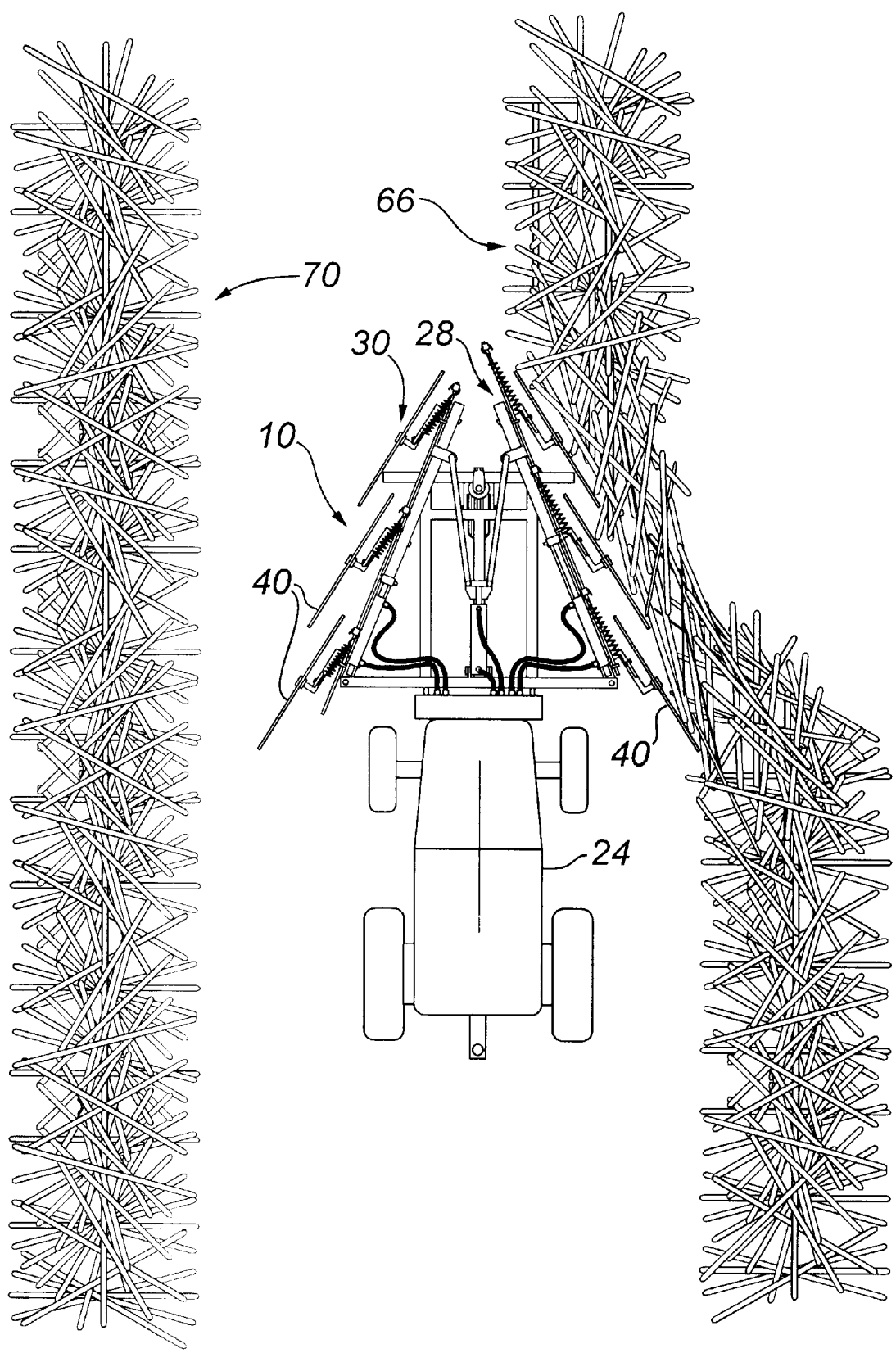
FIG. 5 is a first top plan view of the windrow turning apparatus illustrated in FIG. 1, in operation on a tractor in a field.

The use and operation of windrow turning apparatus 10 will now be described with reference to FIGS. 1 through 6. With windrow turning apparatus 10, a farmer can monitor the windrow turning operation by looking forwardly from his tractor. Prior to beginning windrow turning, the farmer lowers first rake support assembly 28 to the lowered ground engaging position illustrated in FIG. 4 and raises second rake support assembly 30 to the raised travel position illustrated in FIG. 3. As described above, movement of first rake support assembly 28 and second rake support assembly 30 is effected by means of hydraulic cylinders 52 which move control bars 48 in either the first direction or the second direction thereby raising or lowering secondary support arms 34 to which rotary raking wheels 46 are attached. Referring to FIG. 5, on a first pass down the field a first windrow 66 is moved by rotary raking wheels 46 to the right in relation to direction of travel of tractor 24.

Referring to FIG. 6, when tractor 24 reaches the end of the field, it turns, and the farmer raises first rake support assembly 28 and lowers second rake support assembly 30. On the second pass down the field a second windrow 70 is moved by rotary raking wheels 46 to the left in relation to the direction of travel of tractor 24, thereby maintaining windrow spacing. When tractor 24 reaches the end of the field, it turns, and the farmer raises second rake support assembly 30, lowers first rake support assembly 28 and repeats the process on a third pass down the field. The original positioning of first windrow 66 is designated by reference numeral 68. The original positioning of second windrow 70 is designated by reference numeral 72. It can be seen that by alternatively utilizing first rake support assembly 28 and then second rake support assembly 30, the farmer can maintain consistent windrow spacing, as indicated by "S", during the windrow turning operation.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A windrow turning apparatus, comprising:
   a support frame having a first side, a second side, a forward end and a tractor attachment end;
   means for mounting the tractor attachment end of the support frame to a front of a tractor;
   a first rake support assembly being secured to the first side of the support frame for pivotal movement about a first vertical axis, and a first horizontal axis and the first rake support assembly having a remote end;
   first raking means being supported by the first rake support assembly in an operative position at an angle in relation to the support frame extending from the forward end outwardly toward the tractor attachment end;
   a second rake support assembly being secured to the second side of the support frame for pivotal movement about a second vertical axis and a second horizontal axis, and the second rake support assembly having a remote end;
   second raking means being supported by the second rake support assembly in an operative position at an angle in relation to the support frame extending from the forward end outwardly toward the tractor attachment end;
   means for raising and lowering one of the first rake support assembly and the second rake support assembly, thereby bringing at least one of the first raking means and the second raking means into the operative position; and
   a hydraulic linkage rod movement cylinder having a first end secured to the support frame and a second end secured to linkage rods which are attached to the remote end of the first rake support assembly and the remote end of the second rake support assembly, the hydraulic linkage rod movement cylinder providing a motive force to move the linkage rods in a first direction and a second direction, such that movement of the linkage rods in the first direction draws the remote ends of the first rake support assembly and the second rake support assembly together, and movement of the linkage rods in the second direction pushes the remote ends of the first rake support assembly and the second rake support assembly apart, thereby altering the extent to which the first rake support assembly and the second rake support assembly are angled outwardly from the forward end to the tractor attachment end.

2. The windrow turning apparatus as defined in claim 1, wherein the remote ends of each of the first rake support assembly and the second rake support assembly are supported in the operative position by ground engaging wheels, whereby the first rake support assembly and the second rake support assembly independently follow the ground surface contours.

3. A windrow turning apparatus, comprising:
   a support frame having a first side, a second side, a forward end and a tractor attachment end;
   means for mounting the tractor attachment end of the support frame to a front of a tractor:
   a first rake support assembly being secured to the first side of the support frame for pivotal movement about a first vertical axis and a first horizontal axis, and the first rake support having a remote end;
   first raking means being supported by the first rake support assembly in an operative position at an angle in relation to the support frame extending from the forward end outwardly toward the tractor attachment end;
   a second rake support assembly being secured to the second side of the support frame for pivotal movement about a second vertical axis and a second horizontal axis, and the second rake support assembly having a remote end;
   second raking means being supported by the second rake support assembly in an operative position at an angle in relation to the support frame extending from the forward end outwardly toward the tractor attachment end; and each of the first rake support assembly and the second rake support assembly includes:
   a primary support arm;
   a plurality of secondary support arms having a first end and a second end, the first end being pivotally mounted to the primary support arm for pivotal movement about a first substantially horizontal axis, the second end supporting one of a plurality of rotary raking wheels for rotation about a second substantially horizontal axis;
   a control bar associated with each of the primary support arms, each of the secondary support arms being linked by a spring to the control bar such that upon movement of the control bar in a first direction, the secondary support arms are drawn by the springs to a raised travel position and, upon movement of the control bar in a second direction, the secondary support arms are lowered by force of gravity to an operative ground engaging position; and
   hydraulic control bar movement cylinders having a first end secured to one the primary support arms and a second end secured to one of the control bars, the hydraulic control bar movement cylinders providing a motive force to move the control bars in the first direction and the second direction thereby raising the secondary support arms to the travel position and lowering the secondary support arms to the operative ground engaging position.

4. A windrow turning apparatus, comprising:
   a support frame having a first side, a second side, a forward end and a tractor attachment end;
   means for mounting the tractor attachment end of the support frame to a front of a tractor;
   a first rake support assembly being secured to the first side of the support frame for pivotal movement about a first vertical axis and a first horizontal axis;
   a second rake support assembly being secured to the second side of the support frame for pivotal movement about a second vertical axis and a second horizontal axis;

each of the first rake support assembly and the second rake support assembly including a primary support arm, a plurality of secondary support arms having a first end and a second end, the first end being pivotally mounted to the primary support arm for pivotal movement about a first substantially horizontal axis, the second end supporting one of a plurality of rotary raking wheels for rotation about a second substantially horizontal axis, each of the first rake support assembly and the second rake support assembly having a remote end supported by ground engaging wheels, whereby the first rake support assembly and the second rake support assembly independently follow ground surface contours;

control bars associated with each of primary support arms, each of the secondary support arms being linked by a spring to the control bar such that upon movement of the control bar in a first direction, the secondary support arms are drawn by the springs to a raised travel position and, upon movement of the control bar in a second direction, the secondary support arms are lowered by force of gravity to an operative ground engaging position;

hydraulic control bar movement cylinders having a first end secured to one the primary support arms and a second end secured to one of the control bars, the hydraulic control bar movement cylinders providing a motive force to move the control bars in the first direction and the second direction thereby raising the secondary support arms to the travel position and lowering the secondary support arms to the operative ground engaging position;

the rotary raking wheels being supported by the rake support assemblies when in the operative position at an angle in relation to the support frame extending from the forward end outwardly toward the tractor attachment end;

a hydraulic linkage rod movement cylinder having a first end secured to the support frame and a second end secured to by linkage rods which are attached to the remote end of the first rake support assembly the remote end of the second rake support assembly, the hydraulic linkage rod movement cylinder providing a motive force to move the linkage rods in a first direction and a second direction, such that movement in the first direction draws the remote ends of the first rake support assembly and the second rake support assembly together, and movement in the second direction pushes the remote ends of the first rake support assembly and the second rake support assembly apart, thereby altering the extent to which the first rake support assembly and the second rake support assembly are angled outwardly from the forward end to the tractor attachment end of the support frame.

* * * * *